United States Patent [19]
Chaplain

[11] 3,909,018
[45] Sept. 30, 1975

[54] SEALING JOINT FOR PIPES

[75] Inventor: Jacques Chaplain, Sevres, France

[73] Assignee: Societe Industrielle Gaillon-Armoryl "ARMOSIG", La-Celle-Saint-Cloud, France

[22] Filed: June 11, 1973

[21] Appl. No.: 368,464

[30] Foreign Application Priority Data
June 19, 1972  France ............................ 72.21994

[52] U.S. Cl. ............................................ 277/206 A
[51] Int. Cl.² ................................................ F16J 15/32
[58] Field of Search ....................... 277/206, 209, 207

[56] References Cited
UNITED STATES PATENTS

| | | | |
|---|---|---|---|
| 2,688,506 | 9/1954 | Bakker | 277/206 |
| 2,783,106 | 2/1957 | Barnhart | 277/206 |
| 2,809,853 | 10/1957 | Nathan | 277/207 A |
| 2,889,183 | 6/1959 | Peras | 277/206 |
| 3,048,415 | 8/1962 | Shook | 277/207 A |
| 3,189,359 | 6/1965 | Haberkorn | 277/209 |

FOREIGN PATENTS OR APPLICATIONS
595,171  6/1959  Italy ............................. 277/207 A

*Primary Examiner*—Harry N. Haroian

[57] ABSTRACT

The invention is addressed to an annular sealing member adapted to be positioned within the groove of a socket or tulip of cement, metal, plastic or elastomeric pipe sections, in which the sealing joint is characterized by the combination of an external body portion having a cross-section of kidney bean shape and two opposite longitudinally extending lip portions in position to be engaged by the connected pipe section.

10 Claims, 1 Drawing Figure

U.S. Patent   Sept. 30, 1975   3,909,018
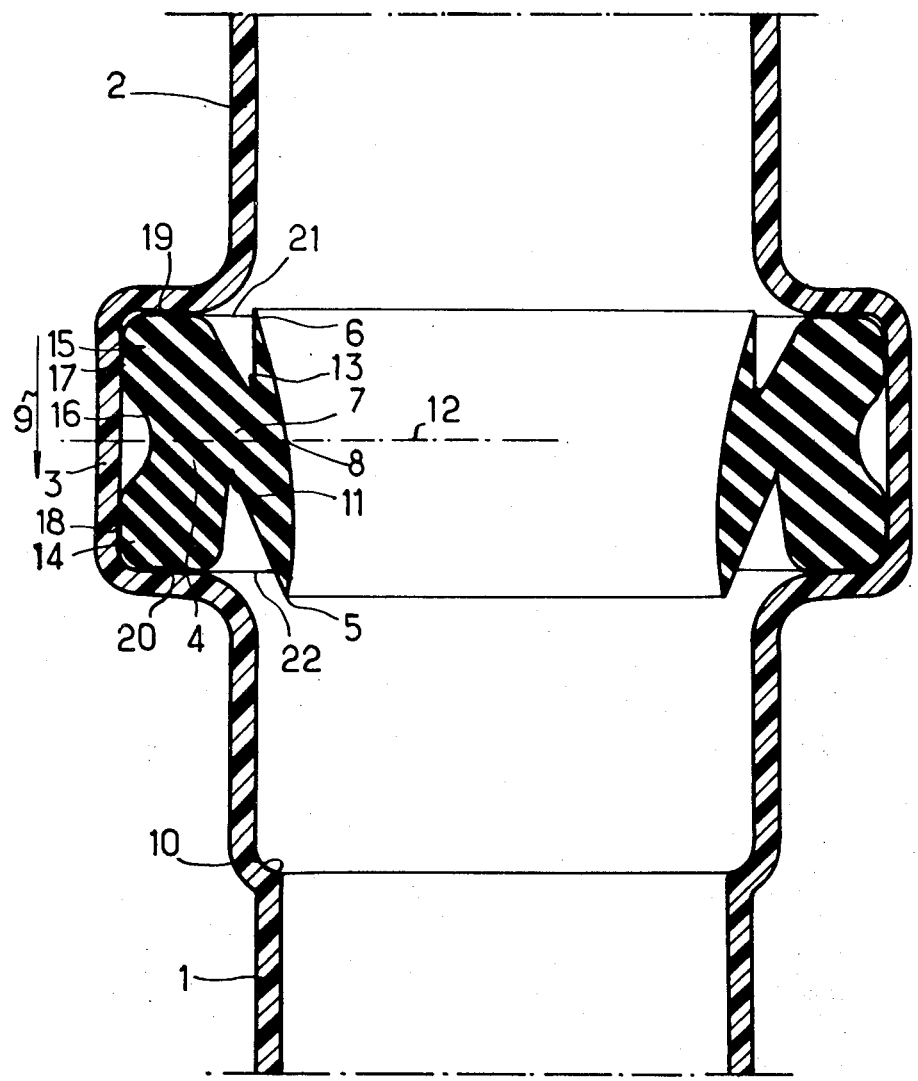

SEALING JOINT FOR PIPES

The invention relates to a sealing joint for two members or pipes adapted to be interconnected by telescoping one within the other, the sealing joint being intended to be positioned within an annular groove or slot provided in a cylindrically enlarged portion, referred to as a socket or tulip, of the pipe or connecting member.

Various types of sealing joints, which are used when pipe sections are set in position, are known. When constructing irrigation pipe systems, use is frequently made of "sealing rings" provided with a plurality of unidirectionally extending lip portions which are intended to seal the connection between the two pipe members in response to the pressure inside the pipes. In water supply conduits, use is generally made of compression rings which are sealed against vacuum or against accidental counter pressures. Some forms have rings with lip portions for completing the sealing action at low pressure and for guiding the male end portions of the pipe members, when the latter are inserted into the socket.

Such types of joints suffer from a number of defects. For example, compression joints are generally not securely held in their housing and, because of this, are subject to displacement therefrom. In addition, such joints must be dimensioned generously so that the joint is operating in the compression region of the material of which it is formed (rubber or synthetic elastomeric material), without which the joint is subject to forces which have a harmful effect on the aging of the material. With respect to the joints having lip portions, they are generally operational only in one direction.

It is an object of this invention to provide a sealing joint which does not suffer from the disadvantages described above.

These and other objects and advantages of this invention will hereinafter appear and for purposes of illustration, but not of limitation, an embodiment of the invention is illustrated in the accompanying drawing which is a cross-sectional view of one end of the pipe member and sealing joint, embodying the features of this invention.

In accordance with the practice of this invention, the joint is characterized in that it functions both as a joint with lip portions and as a compression joint to give the desired sealing effect both from internal pressure and from external pressure.

In accordance with one embodiment of the invention, the annular joint is characterized by the combination of an external body portion, having a cross-section through the axis half plane, having the shape of a kidney bean, and two inner lip portions which extend in opposite directions relative to each other and which are connected to the convex portion forming the inner wall or the back of the kidney bean cross-section, with the opposite concave portion of the kidney bean cross-section facing outwardly.

In the preferred embodiment, the joint is of annular configuration having a cross-section through a half plane, through the axis of revolution, which comprises a portion, forming the external body portion of the annular member, which has the shape of an open omega or kidney bean, and two annular lip portions which are an integral part of the joint. One annular lip portion, defined as the upstream lip portion, has an internal diameter which is greater than the external diameter of a uniform or male end of the pipe member to be inserted. The other lip portion, referred to as the downstream lip portion, has a diameter which is slightly less than the external diameter of the pipe member to be inserted. The central portion, connecting the two lip portions, is of a diameter which is less than the outer diameter of the pipe member to be inserted with the front lip portion being dimensioned to be shorter in length than the rear lip portion. The terms upstream and rear, forward and rearward, are to be understood as meaning in the order of which the parts in the joint come into contact with the male end of the pipe member, when inserted into the socket.

The lip portions are characterized in that they extend in opposite directions longitudinally and are of different conical shape, the upstream lip portion tapering conically along the line of introduction of the male end of the pipe member, and the downstream lip portion being of more acute conicity or being conical in the reverse direction. In accordance with a preferred embodiment, the downstream lip portion is longer than the upstream lip portion and its point of connection to the external body portion is spaced less from the central plane of the joint, perpendicular to the axis of the pipe member than the point of connection of the upstream lip portion.

The invention can be employed with tubular members or pipes formed of various materials, such as metal, cement, hardened rubber, plastic material such as rigid polyvinyl chloride, post-chlorinated polyvinyl chloride, acrylonitrile-butadiene-styrene interpolymer, and the like. The sealing joints can be made of natural rubber, synthetic elastomer, or plastic material having a low modulus such as plasticized polyvinyl chloride, or modified polyethylene, having a degree of flexibility similar to that of rubber.

The single FIGURE shows a sectional view of the sealing member.

With reference now to the drawing, illustration is made of a pipe or connecting member 1 in which a socket or tulip 2 is formed. Formed in the socket 2 is an annular groove 3 which serves to receive the external body portion 4 of the sealing member, in which the external body portion has a cross-section corresponding somewhat to the shape of a kidney bean. The external body portion 4 is connected integrally with a downstream lip portion 5 and a upstream lip portion 6 through a central zone 7. The lip portions 5 and 6 are jointed at 8. The arrow 9 indicates the direction of insertion of the male end portion of the pipe member to be connected, and which is inserted to within the vicinity of the abutment 10 of the socket 2, which is beyond the annular groove 3.

The connection at 11, of the downstream lip portion 5 to the body portion 4 is closer to the center line 12 of the external body portion 4, than the connection at 13 of the upstream lip portion 6 to the external body portion. The internal diameter of the circular lip portion 6 is greater than the external diameter of the male end portion of the pipe member to be inserted (not shown) while the internal diameter of the connection zone 8 and the downstream lip portion 5 are both less than the external diameter of the male end portion of the pipe member to be inserted.

It will be noted that the body portion 4 has enlarged portions 14 and 15 at the longitudinally spaced end sections. These enlarged portions are intended to hold the joint in position and they are separated by a central concave surface 16 of the body portion 4. Moreover, the body portion 4 and the enlarged portions 14 and 15 bear against the inner wall and the side of the annular groove 3 at 17, 18, 19 and 20, the plane normal to the axis of the pipe member 1 passing through the zone 19 (line 21) for substantially the same distance from the center line 12 as the end point of the lip portion 6. On the other hand, the plane normal to the axis of the pipe 1 passing through the zone 20 (line 22) is closer at the center line 12 than the end point of the downstream lip 5. In other words, the end point of lip 6 is spaced from the center line 12 by a lesser amount than the end point of lip 5.

The method of use and the manner of location of the joint will hereinafter be briefly described.

The annular joint is positioned within the annular groove 3, with the enlarged portions 14 and 15 being engaged in gripping relation therein. The male end of the pipe member to be inserted (not shown), which is preferably lubricated, is then telescoped into the socket 2 and is advanced axially to the vicinity of the abutment 10. As it passes through the tulip portion of the pipe, the male end operates progressively to compress the central part of the joint pushing it firmly against the wall of the groove 3. Because of the conical configuration of the upstream lip portion 6, extending in the direction in which the male end is inserted, and because of the chamfer normally provided at the male end, the male end of the pipe member is easily introduced into the pipe member 1 without causing the low lip portion 6 to be turned over. The lip portion 6 is progressively flattened in combination with the body portion 4, which insures that the connection between the two pipe members is sealed from the direction of the outer end of the pipe member.

Likewise, the downstream lip portion 5, in combination with the body portion 4, seals the pipe member from within the pipe or from the inside toward the outside. Thus a sealed connection is established, both in the event of a reduced pressure and in the event of an increased pressure relative to the external pressure.

From the point of view of relative dimensions of the different parts of the joint, the following conditions prevail in the preferred embodiment.

the entry diameter of the upstream lip portion is about 1-2 percent greater than the external diameter of the male end of the pipe member to be engaged in the socket;

the internal diameter of the end of the downstream lip portion 5 is 3-5 percent less than the external diameter of the male end of the pipe member to be inserted;

the length of the downstream lip portion is 20-40 percent greater than the length of the upstream lip portion;

relative to the central plane of the joint, perpendicular to the axis of the pipe member (line 12 of the drawing), the distance of the point of connection of the upstream lip portion is 15-30 percent greater than the distance of the point of connection of the downstream lip portion;

the internal diameter at the level of the connection zone 8 is 1-1.5 percent less than the external diameter of the male end of the pipe to be inserted;

the point of connection of the downstream lip portion is axially spaced slightly more from the axis of the pipe member than the point of connection of the upstream lip member;

the width of the joint is of the order of 10 percent of the diameter of the male end of the pipe member to be inserted, for a diameter of 315 mm, to 30-40 percent for a diameter of 160 mm;

the thickness of the joint in line with the connecting plane (center line 12) depends somewhat on the admissible tolerances for the male end of the pipe member to be inserted.

It will be evident from the foregoing that the shape, dimension and position respectively of the enlarged portions 14 and 15, the connecting zone 8, the concave surface 16, the center line of the joint 12, and the downstream and upstream lip portions 5 and 6 provide that, without requiring a high degree of compression, it is possible to effect sealing from both longitudinal directions, as indicated above. For this reason, the joint can be made of materials having various degrees of hardness within the range of "international" hardness conventionally defined in the rubber industry.

It will be understood that changes may be made in the details of construction, arrangement and operation without departing from the spirit of the invention, especially as defined in the following claims.

I claim:

1. An annular sealing joint adapted to be seated in an annular groove within a hollow female pipe member for establishing a sealing connection with an inserted portion of a male pipe member comprising an outer annular base portion dimensioned to be received within said annular groove, an upstream lip and a downstream lip extending axially in opposite directions from an inner portion of said base member with the ends of said lips spaced radially from the base portion, the inner surface of the upstream lip tapering gradually from an internal diameter at the upstream end which is greater than the diameter to an internal diameter which is less than the diameter of the male member beyond the upstream end, the inner surface of the downstream lip having a diameter throughout its length which is less than the diameter of the male member, in which the outer annular base portion is of a cross-section in an axial half plane in the shape of a kidney bean with the concave portion facing outwardly and the convex portion facing inwardly and in which the lips are joined to the convex portion forming the back of the kidney bean shaped in cross-section and in which the upstream lip extends upstream in the direction of the insertion of the male end of the pipe member to be inserted and is frustoconical in cross-section with the small base downstream, while the downstream lip extends downstream and is of conical shape differing from that of the upstream lip.

2. An annular sealing joint as claimed in claim 1 in which the zone of connection between the upstream lip and the downstream lip have an internal diameter which is less than the external diameter of the male end of the member to be inserted.

3. An annular sealing joint as claimed in claim 1 in which the point of connection of the upstream lip portion to the base portion is further from the central plane of the joint, perpendicular to the axis of symmetry, than the point of connection of the downstream lip.

4. An annular sealing joint as claimed in claim 1 in which the downstream lip is dimensioned to have a length greater than the length of the upstream lip.

5. An annular sealing joint as claimed in claim 1 in which the entry diameter at the point of the upstream lip is about 1-2% greater than the external diameter of the male end of the pipe member adapted to be inserted therein.

6. An annular sealing joint as claimed in claim 1 in which the internal diameter of the end of the downstream lip is 3-5% less than the external diameter of the male end of the pipe member to be inserted.

7. An annular sealing joint as claimed in claim 1 in which the length of the downstream lip is 20-40% greater than the length of the upstream lip.

8. An annular sealing joint as claimed in claim 1 in which relative to the central plane of the joint, perpendicular to the axis of the pipe member, the distance of the point of connection of the upstream lip is 15-30% greater than the distance of the point of connection of the downstream lip.

9. An annular sealing joint as claimed in claim 1 in which the internal diameter of the level of the zones interconnecting the lip portions is 1-1.5% less than the external diameter of the male end of the member to be inserted.

10. An annular sealing joint as claimed in claim 1 in which the point of connection of the downstream lip is spaced slightly more from the axis of the pipe member than the point of connection of the upstream lip.

* * * * *